United States Patent
Harkins (10) Patent No.: US 10,054,470 B2
(45) Date of Patent: Aug. 21, 2018

(54) INDICATING DEVICE WITH POINTER HAVING COUNTERWEIGHT

(71) Applicants: DENSO International America, Inc., Southfield, MI (US); DENSO CORPORATION, Kariya, Aichi-pref. (JP)

(72) Inventor: Ian Harkins, Flat Rock, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 224 days.

(21) Appl. No.: 15/060,949

(22) Filed: Mar. 4, 2016

(65) Prior Publication Data

US 2017/0254682 A1 Sep. 7, 2017

(51) Int. Cl.
| | |
|---|---|
| *G01D 13/22* | (2006.01) |
| *G01D 11/28* | (2006.01) |
| *G01D 13/28* | (2006.01) |
| *G01D 13/02* | (2006.01) |
| *G01D 13/26* | (2006.01) |

(52) U.S. Cl.
CPC .............. *G01D 13/28* (2013.01); *G01D 13/02* (2013.01); *G01D 13/22* (2013.01); *G01D 13/265* (2013.01)

(58) Field of Classification Search
CPC ........ G01D 11/28; G01D 13/02; G01D 13/22; G01D 13/26; G01D 13/265; G01D 13/28
USPC ................... 116/286–288; 362/23.01–23.2
See application file for complete search history.

(56) References Cited

U.S. PATENT DOCUMENTS

| | | | | |
|---|---|---|---|---|
| 5,199,376 | A | | 4/1993 | Pasco |
| 6,120,158 | A | * | 9/2000 | Ishimaru et al. ...... B60K 35/00 116/288 |
| 6,302,551 | B1 | * | 10/2001 | Matumoto ............. B60K 37/02 362/23.16 |
| 7,163,303 | B1 | | 1/2007 | Venkatram |
| 7,635,192 | B2 | * | 12/2009 | Takatsuka et al. .... B60K 37/02 340/815.78 |
| 7,665,857 | B2 | * | 2/2010 | Harada et al. ......... G01D 11/28 116/288 |
| 9,499,097 | B2 | * | 11/2016 | Birman et al. ........ G01D 13/265 |
| 2005/0281018 | A1 | * | 12/2005 | Birman et al. ......... G01D 11/28 362/23.14 |
| 2013/0314891 | A1 | * | 11/2013 | Miyazawa et al. .. G01D 13/265 362/23.14 |
| 2015/0138751 | A1 | * | 5/2015 | Sherman et al. .... G01D 13/265 362/23.21 |
| 2015/0151677 | A1 | | 6/2015 | Birman et al. |
| 2017/0010138 | A1 | * | 1/2017 | Oh ......................... G01D 11/28 |

FOREIGN PATENT DOCUMENTS

| | | | | |
|---|---|---|---|---|
| CN | 204359334 U | * | 5/2015 | ............. G01D 13/28 |
| EP | 0499536 A1 | * | 8/1992 | ............. G01D 11/28 |
| EP | 1055916 B1 | | 7/2003 | |
| JP | 5110687 B2 | * | 12/2012 | ............. G01D 13/22 |
| KR | 20110072484 A | * | 6/2011 | ............. G01D 11/28 |

* cited by examiner

*Primary Examiner* — Richard A Smith (57) ABSTRACT

A pointer is rotational relative to a dial plate. The pointer includes a body, a needle and a counterweight. The needle extends radially outward from the body. The counterweight is a separate component from the body and is affixed to the body. The counterweight is located on an opposite side of the body from the needle.

12 Claims, 9 Drawing Sheets

FIG. 1

VERTICAL
(AXIAL)

RADIAL

CIRCUMFERENTIAL

INDICATING DEVICE WITH POINTER HAVING COUNTERWEIGHT

TECHNICAL FIELD

The present disclosure relates to an indicating device with a pointer having a counterweight. The present disclosure further relates to the pointer.

BACKGROUND

Conventionally, an indicating device such as a dial gauge includes a pointer rotational to indicate information such as a speed or an engine revolution of a vehicle. A pointer may include a needle, which may cause torque about a rotational shaft. A pointer may be desirable to have a configuration to mitigate such a torque.

SUMMARY

According to an aspect of the preset disclosure, a pointer may be rotational relative to a dial plate. The pointer may include a body, a needle, and a counterweight. The needle may extend radially outward from the body. The counterweight may be a separate component from the body and may be affixed to the body. The counterweight may be located on an opposite side of the body from the needle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "CIRCUMFERENTIAL" may correspond to a circumferential direction.

Figure 1:
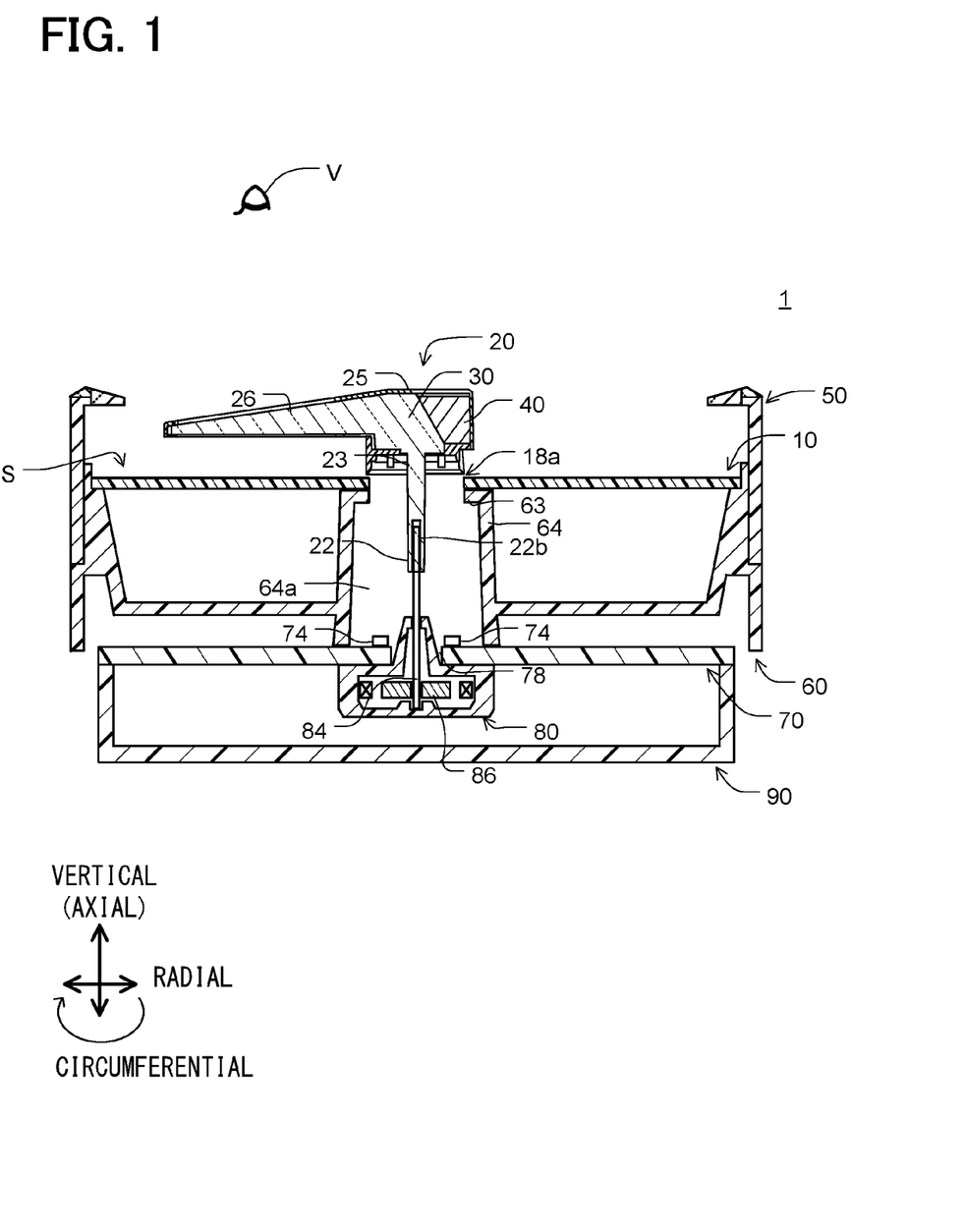
FIG. 1 is a sectional view showing an indicating device.

In FIG. 1, the indicating device 1 is, for example, an engine revolution meter for an automobile. The indicating device 1 includes a pointer 20, a dial plate 10, a dial cover 50, a main housing 60, a printed circuit board (PCB) 70, a driver unit 80, and a rear housing 90.

The dial plate 10 has a display surface facing a viewer V such as an occupant of an automobile. The dial plate 10 is in a circular shape when viewed from the viewer V. The dial plate 10 has indication marks such as a dial gauge and symbols S to form a gauge meter. The symbols S may be numbers denoting engine revolution. The dial plate 10 may be formed of resin such as polycarbonate. The dial plate 10 has a center hole 18a at its center.

The dial cover 50 is a tubular member placed above the dial plate 10. The pointer 20 is inserted in the center hole 18a of the dial plate 10. The pointer 20 is located adjacent to the display surface of the dial plate 10. The pointer 20 includes a pointer shaft 23, a needle 26, a body 30, a cover 25, and a counterweight 40.

The body 30 and the needle 26 are located above the center hole 18a of the dial plate 10. The pointer shaft 23 extends through the center hole 18a. The cover 25 is coupled with the body 30 to enclose the needle 26 and the body 30.

The PCB 70 is located between the main housing 60 and the rear housing 90. The PCB 70 has a center hole 78 at its center. The PCB 70 is equipped with electronic wirings and electronic devices such as a microprocessor. The PCB 70 is further equipped with light emitting diodes (LED, light source) 74 around the center hole 78.

The driver unit 80 is equipped to the PCB 70. For example, the driver unit 80 may be soldered to the PCB 70. The driver unit 80 may be an electric motor such as a stepper motor. The driver unit 80 includes a drive shaft 84 and a motor portion 86. The drive shaft 84 is coupled with a rotor of the motor portion 86. The motor portion 86 includes a stator configured to receive electricity from a controller (not shown) via the wiring of the PCB 70 to generate a magnetic field and to drive the drive shaft 84 via the rotor. The driver unit 80 may be equipped with reduction gears combined with the motor portion 86.

The pointer shaft 23 has a pointer end 22 in the axial direction. The pointer end 22 has a drive shaft hole 22b into which the drive shaft 84 is inserted. Thus, the drive shaft 84 is coupled with the pointer shaft 23 of the pointer 20 to manipulate the pointer 20 at an appropriate position to point tick marks and the symbols S on the dial plate 10.

The main housing 60 includes a housing center 64 defining a tubular hollow 64a. The housing center 64 has a brim 63 extending radially inward toward the pointer shaft 23. The pointer shaft 23 and the drive shaft 84 are partially located in the tubular hollow 64a. The rear housing 90 is equipped to the PCB 70 to accommodate the driver unit 80.

Figure 2:
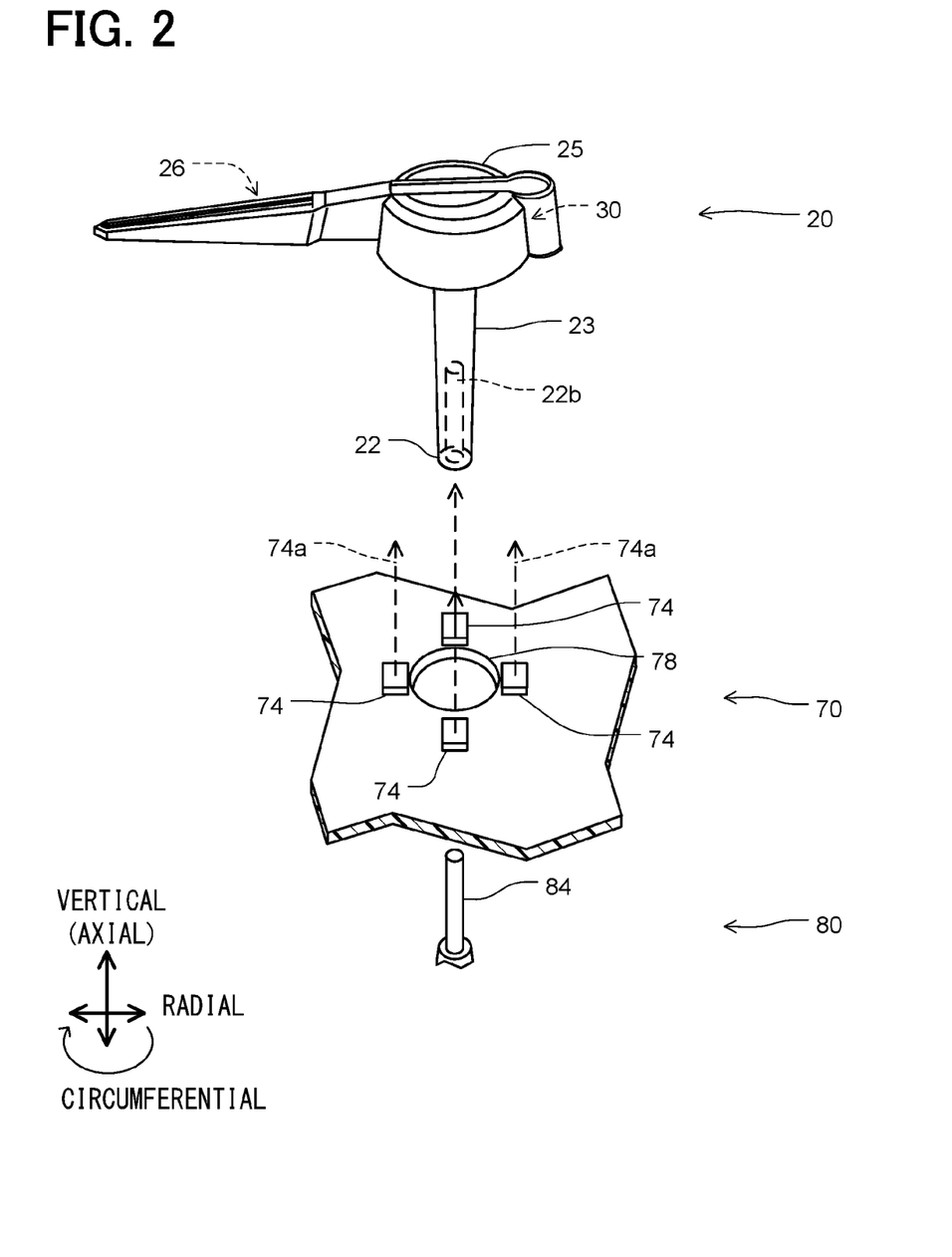
FIG. 2 is a perspective view showing components of the indicating device.

As shown in FIG. 2, the pointer 20 is coupled with the drive shaft 84 of the driver unit 80 through the center hole 78 of the PCB 70. The drive shaft 84 of the driver unit 80 is located to be coaxial with the pointer shaft 23. After the connection, the drive shaft 84 of the driver unit 80 extends through the PCB 70.

The LEDs 74 include multiple light source elements 74 located on the radially outside of the drive shaft 84 to surround the drive shaft 84. The LEDs 74 are positioned on the PCB 70, such that a rear side of the pointer 20 is opposed to optical axes 74a of the LEDs 74.

Figure 3:
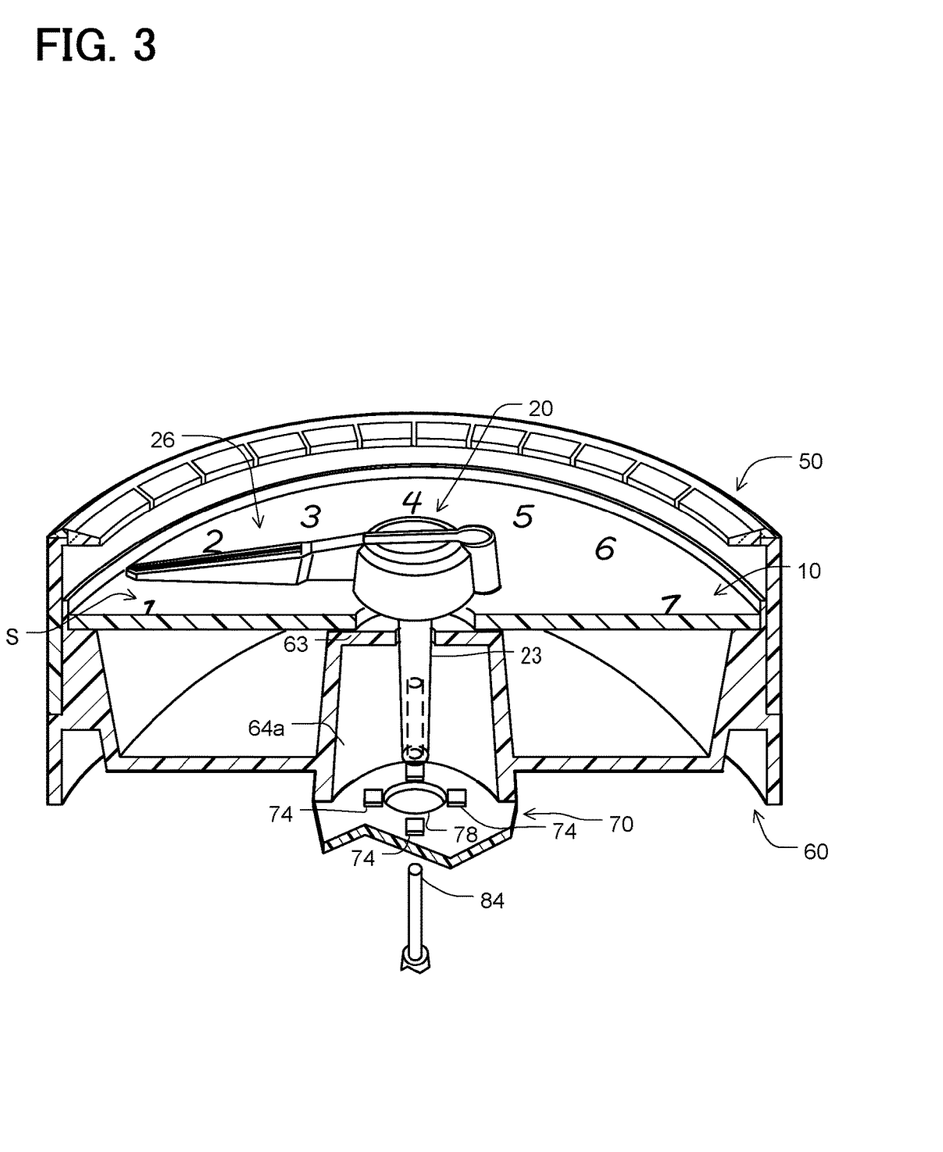
FIG. 3 is a perspective sectional view showing the indicating device.

FIG. 3 shows a part of the indicating device 1. The indicating device 1 may be assembled through the following steps. First, the driver unit 80 is soldered on the PCB 70. The main housing 60 is mounted onto the PCB 70. The dial gauge 10 is mounted onto the main housing 60. The dial cover 50 is mounted onto the dial gauge 10 and the main housing 60. Finally, the pointer 20 is mounted to the drive shaft 84.

Figure 4:
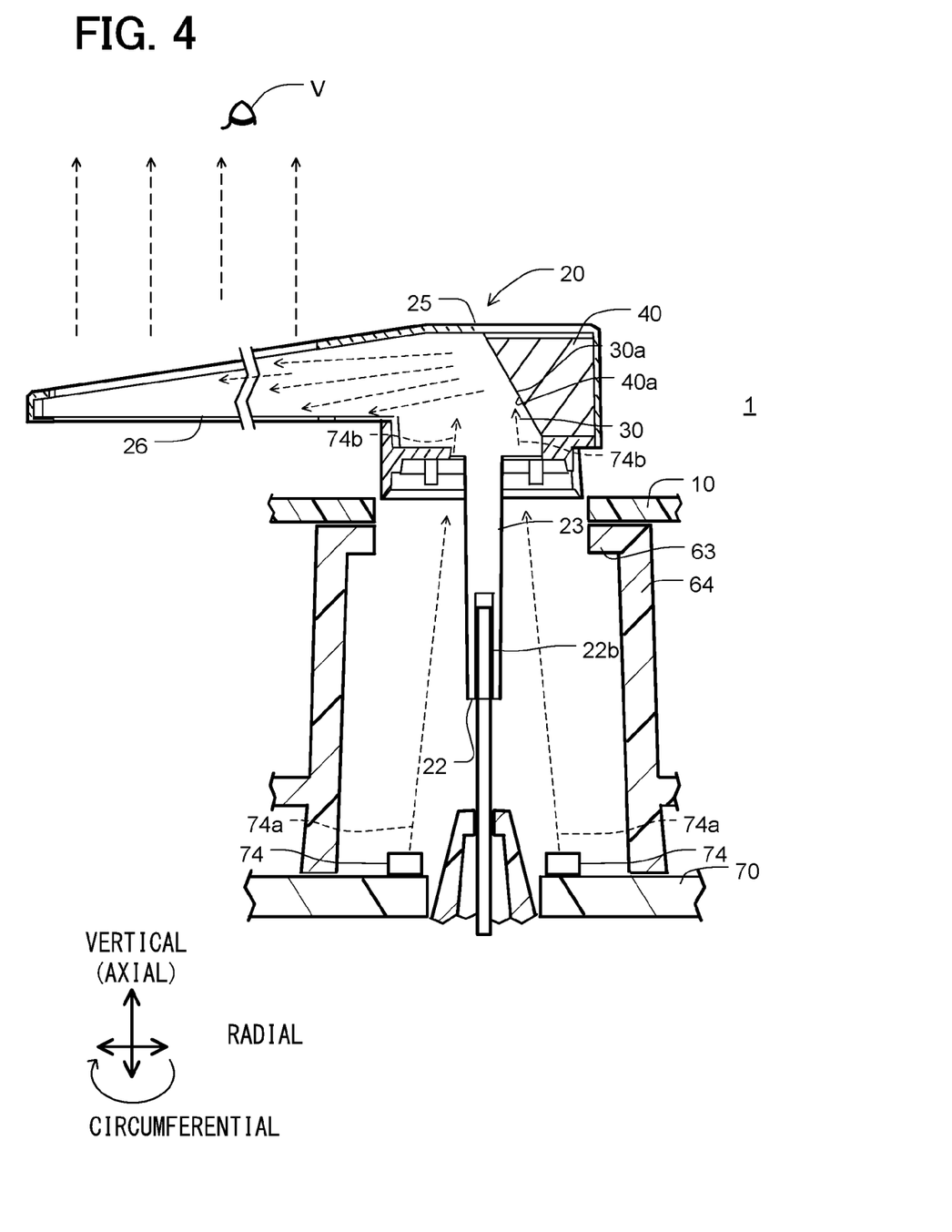
FIG. 4 is an explanatory view showing components of the indicating device.

As shown in FIG. 4, the body 30 of the pointer 20 has an angled surface 30a. The angled surface 30a is a flat surface inclined at an angle relative to an axial direction of the drive shaft 84. The counterweight 40 of the pointer 20 has a reflective surface 40a. The reflective surface 40a is a flat surface inclined at an angle relative to the axial direction of the drive shaft 84. The counterweight 40 is mounted on the body 30 such that the reflective surface 40a of the counterweight 40 is mated to the angled surface 30a of the body 30. When the pointer 20 is mounted to the drive shaft 84, the LEDs 74 are opposed to both the angled surface 30a of the body 30 and the reflective surface 40a of the counterweight 40. Thus, the angled surface 30a and the reflective surface 40a are enabled to receive light emitted from the LEDs 74 through the body 30.

When each of the LEDs 74 is energized, the LED 74 emits light along the optical axis 74a. The light passes through a rear side of the body 30 of the pointer 20. In this way, the rear side of the body 30 functions as a light pickup to receive light from the LEDs 74. The light further passes along an optical path 74b through the body 30 toward the angled surface 30a of the body 30 and the reflective surface 40a of the counterweight 40. The light is reflected on the angled surface 30a of the body 30 and the reflective surface 40a of the counterweight 40. The reflected light is directed toward the needle 26 and is further reflected in the needle 26 toward the viewer V. In this way, the light illuminates the pointer 20, and the illuminated pointer 20 is rendered viewable for the viewer V.

Figure 5:
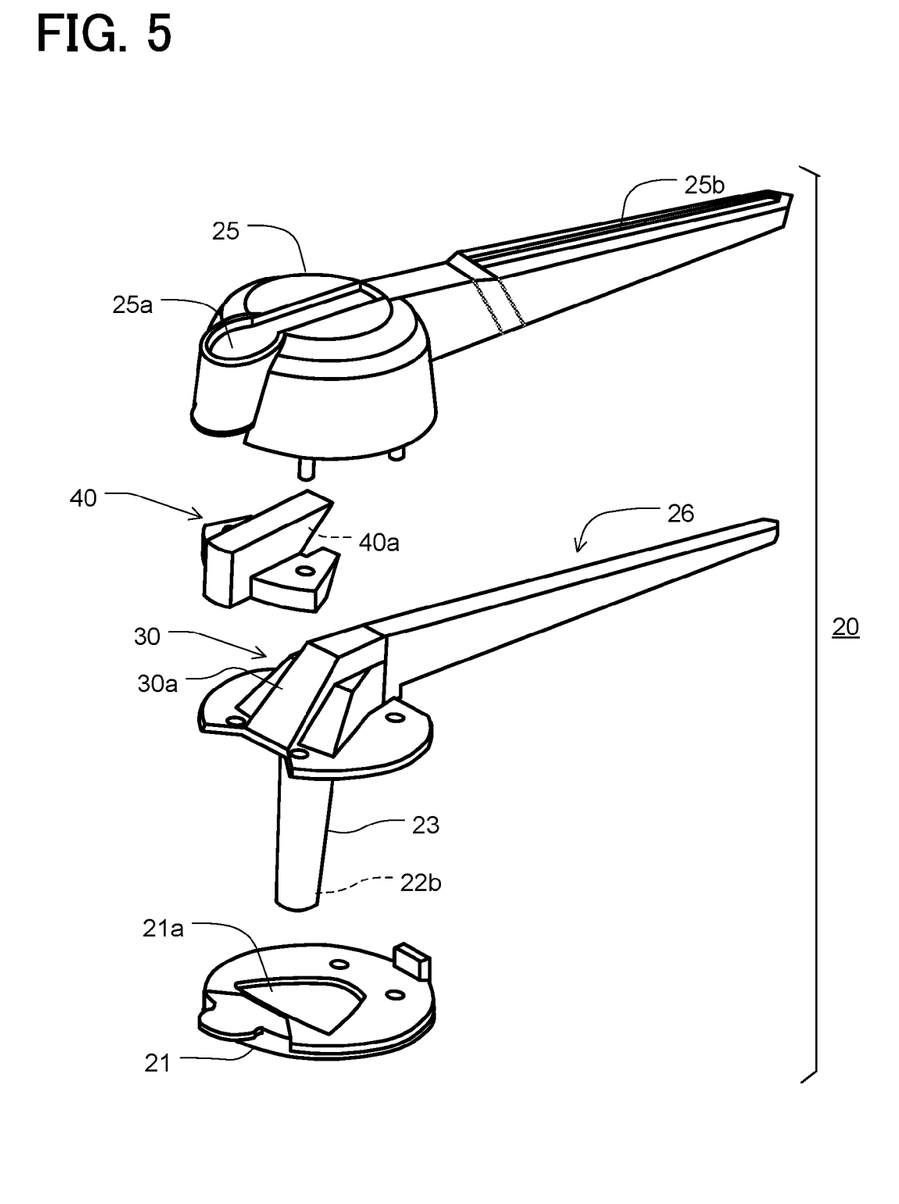
FIG. 5 is an exploded view showing components of a pointer of the indicating device.

As follows, the pointer 20 will be described further in detail. As shown in FIG. 5, the pointer 20 includes the body 30, the pointer shaft 23, the needle 26, the counterweight 40, the cover 25, and a shield 21.

The pointer shaft 23 extends from the body 30 downward in the drawing. The needle 26 extends radially outward from the body 30 in a direction perpendicular to the pointer shaft 23. In the example, the pointer shaft 23, the needle 26, and the body 30 are integrally formed of a non-opaque light-conductive material such as a translucent resin (e.g., polycarbonate resin or PMMA resin).

The counterweight 40 is a separate component from the body 30. The counterweight 40 is affixed to the body 30. Thus, the counterweight 40 is located on the opposite side of the body 30 from the needle when attached to the body 30.

The counterweight 40 is formed of a material, which is higher in density than the material of the needle 26. In the present example, the counterweight 40 is formed of a metallic material. The counterweight 40 is less than the needle 26 in the length. The counterweight 40 is higher than the needle 26 in the width. The cover 25 is a hollow member formed of, for example, an opaque material such as ABS resin. The cover 25 includes a main body in a dome shape and a hollow arm extended from the main body. The main body has a window 25a. The hollow arm has a slit 25b. The window 25a and the slit 25b are through holes extending through the main body and the hollow arm of cover 25, respectively, in a thickness direction.

The shield 21 is a disc-shaped member formed of, for example, an opaque material such as ABS resin. The shield 21 has an opening 21a through which the body 30 is partially exposed.

As follows, one example of an assembling process of the pointer 20 will be described. First, the body 30 is mounted onto the shield 21. Specifically, the pointer shaft 23 is inserted through the opening 21a of the shield 21, and the body 30 may be snap-fitted to the shield 21. More specifically, the shield 21 has protrusions located at both radial ends and raised upward in the drawing towards the body 30. The body 30 has recesses located at both radial ends and dented radially inward. The protrusions of the shield 21 are snap-fitted to the recesses of the body 30. In this way, the shield 21 is located on the bottom side of the body 30, such that the rear side of the body 30 is partially exposed through the opening 21a. Subsequently, the counterweight 40 is attached to the body 30, such that the reflective surface 40a of the counterweight 40 is mated to the angled surface 30a of the body 30.

Figure 6:
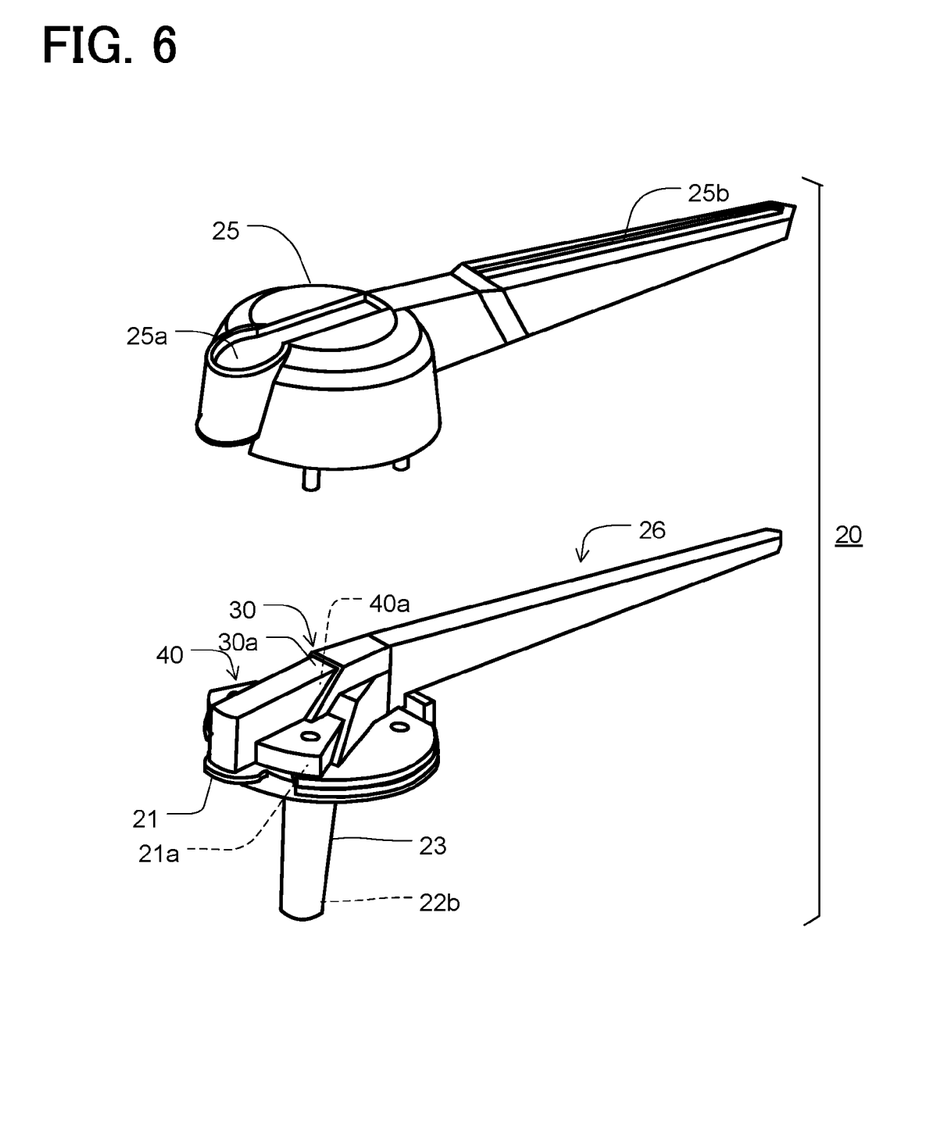
FIG. 6 is an exploded view showing the components partially assembled.

Thus, as shown in FIG. 6, the counterweight 40, the body 30, and the shield 21 are assembled together. In the present state, the reflective surface 40a of the counterweight 40 and the angled surface 30a of the body 30 are opposed to the opening 21a of the shield 21.

Figure 7:
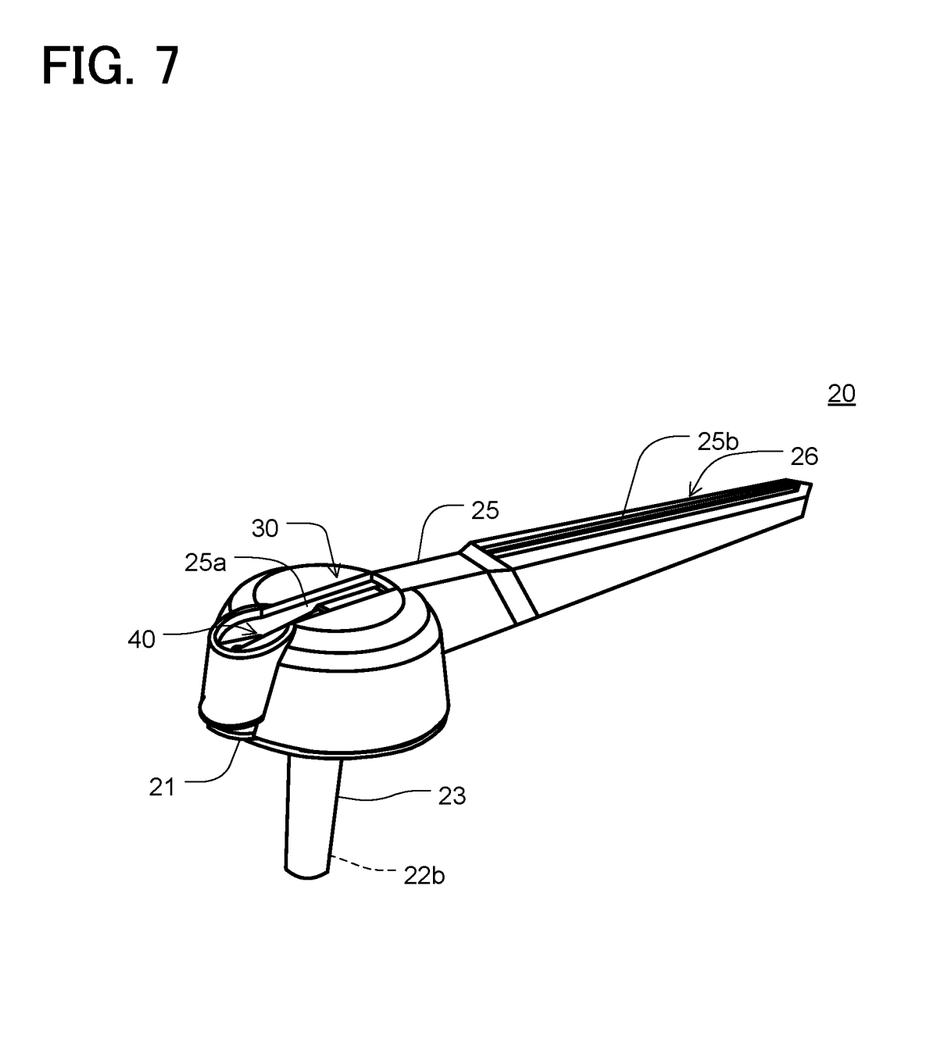
FIG. 7 is a perspective view showing the components assembled.

Subsequently, the cover 25 is mounted onto the counterweight 40, the body 30, and the shield 21. Specifically, in the example, the cover 25 has pins, each of which is in a bar shape and extended downward in the drawing towards the components 40, 30, 21. The pins of the cover 25 are inserted through holes formed in the counterweight 40, the body 30, and the shield 21, such that the pins penetrate through the all components 40, 30, 21. Thus, as shown in FIG. 7, the pointer 20 is assembled together. In the present assembled state, the cover 25 surrounds the body 30, the needle 26, and the counterweight 40. The counterweight 40 is partially exposed through the window 25a of the cover 25. The needle is partially exposed through the slit 25b of the cover 25.

Figure 8:
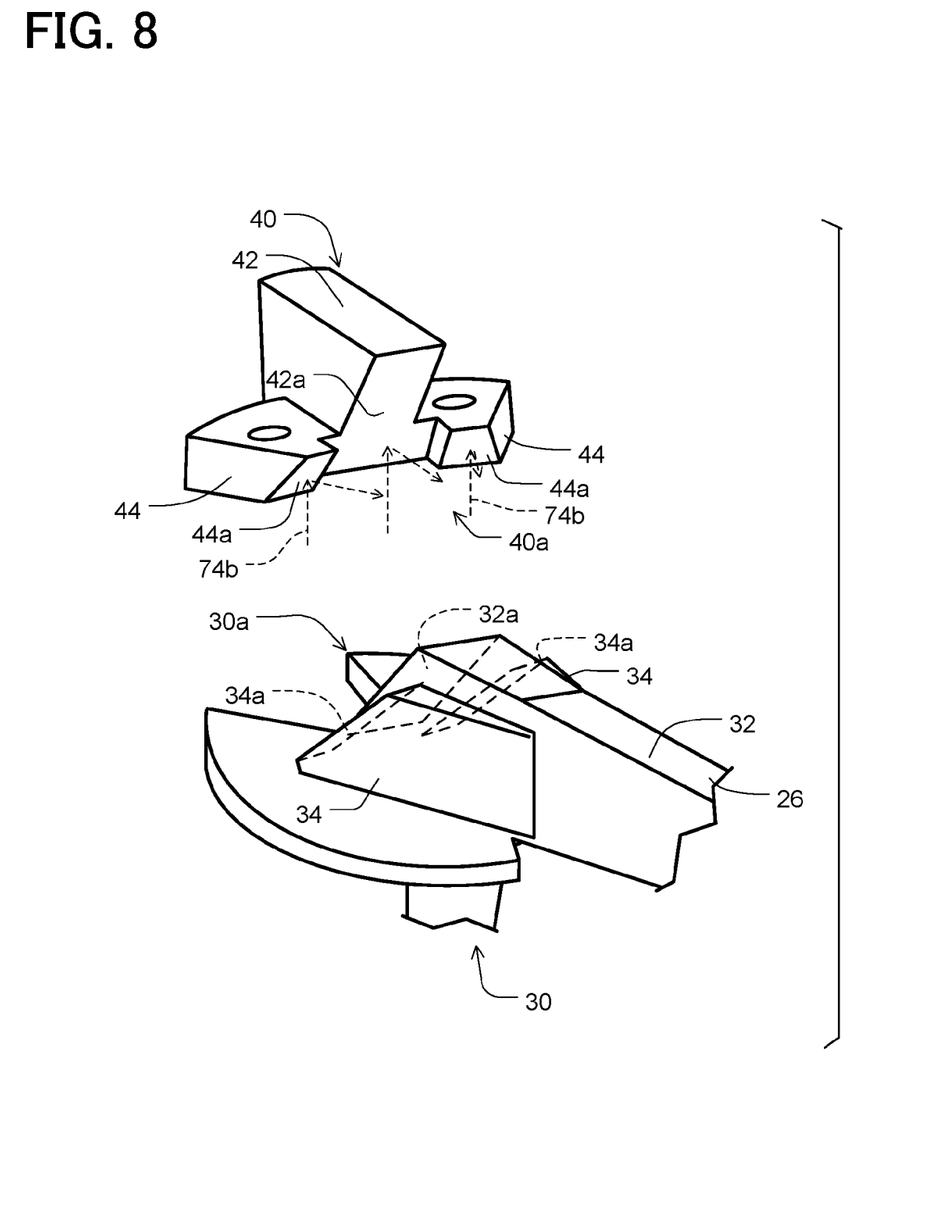
FIG. 8 is an exploded perspective view showing a body and a counterweight of the pointer.

As follows, the body 30 of the pointer 20 and the counterweight 40 will be described further in detail. As shown in FIG. 8, the counterweight 40 includes a main counterweight portion 42 and side counterweight portions 44. The main counterweight portion 42 and the side counterweight portions 44 may be integrally formed of a metallic material or a plastic material coated in metal. Specifically, the counterweight 40 may be applied with chrome plating by using copper-nickel-chromium alloy. The side counterweight portions 44 are projected outward from side peripheries of the main counterweight portion 42. The main counterweight portion 42 has a main reflective surface 42a. Each of the side counterweight portions 44 has a side reflective surface 44a. The main reflective surface 42a and the side reflective surfaces 44a form the reflective surface 40a.

The reflective surface 40a may be formed by polishing the metallic material of the counterweight 40 to form a lustered surface to reflect light. More specifically, for example, the reflective surface 40a may be formed by vibration polishing or tumble polishing. Alternatively or in addition, the reflective surface 40a may be formed by electro chrome plating, chrome foil hot stamping, or physical vapor deposition (PVD).

The body 30 includes a main body portion 32 and side body portions 34. The main body portion 32 and the side body portions 34 may be integrally formed of a non-opaque resin material. The side body portions 34 are projected outward from side peripheries of the main body portion 32. The main body portion 32 has a main angled surface 32a. Each of the side body portions 34 has a side angled surface 34a. The main angled surface 32a and the side angled surface 34a form the angled surface 30a.

The main reflective surface 42a of the counterweight 40 is mated with and faced to the main angled surface 32a of the body 30. The side reflective surface 44a of the counterweight 40 is mated with and faced to the side angled surface 34a of the body 30. Thus, the reflective surface 40a is closely laminated on the angled surface 30a not to form a gap therebetween.

Figure 9:
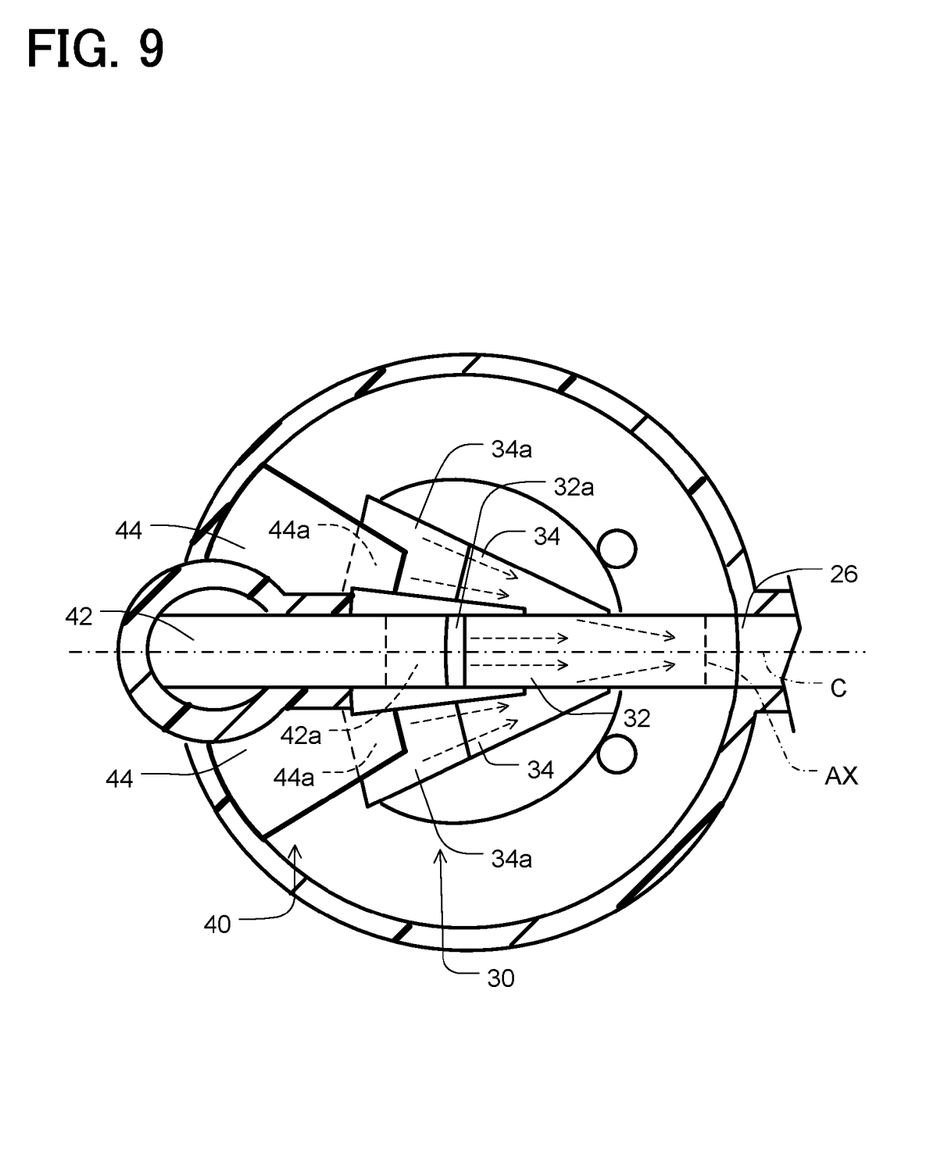
FIG. 9 is a sectional view showing a part of the pointer.

As shown in FIG. 9, an axial section AX of the needle 26 is perpendicular to the center C of the needle 26. The side reflective surfaces 44a of the counterweight 40 are angled relative to the axial section AX of the needle 26 to direct light toward a center C of the needle 26. The side angled surfaces 34a of the body 30 are angled relative to the axial section AX of the needle 26 to direct light toward a center C of the needle 26.

In this example, the main reflective surface 42a is smaller than the main angled surface 32a. It is noted that, the main reflective surface 42a may be larger than the main angled surface 32a or may be same as the main angled surface 32a in size. In this example, the side reflective surface 44a is smaller than the side angled surface 34a. It is noted that, the side reflective surface 44a may be larger than the side angled surface 34a or may be same as the side angled surface 34a in size. Therefore, in the present state in which the counterweight 40 is mounted to the body 30, the main reflective surface 42a covers a part of the main angled surface 32a, and the side reflective surface 44a covers a part of the side angled surface 34a.

The angled surface 30a of the body 30, which includes the angled surfaces 32a and 34a, forms a primary reflective surface. The reflective surface 40a, which includes the reflective surfaces 42a and 44a, forms a secondary reflective surface. Both the angled surface 30a and the reflective surface 40a reflect light incident from the LEDs 74 toward the needle 26. Thus, the counterweight 40 forming the secondary reflective surface may enhance reflection of light in addition to the primary reflective surface formed with the body 30 of the pointer 20. In addition, the counterweight 40 being opaque object may reduce leakage of light emitted from the LEDs 74 through the angled surface 40a.

The counterweight 40 may function as a balancer located on the opposite side of the needle 26 across the body 30. The counterweight 40 may negate torque caused by weight of the needle 26 and exerted on the pointer shaft 23. When the pointer 20 is assembled together, a front surface of the main counterweight portion 42 may be viewable by the viewer V through the window 25a of the cover 25. The fore-surface of the main counterweight portion 42 may be polished to have a lustered surface. The fore-surface of the main counterweight portion 42 showing metallic luster may render additional visual effect to the illumination of the needle 26 of the pointer 20.

Other Embodiments

The indicating device 1 may be used in various control panels or instrument panels, such as a speedo meter, fuel meter, or mileage meter, other than the engine revolution meter.

The counterweight, the body, and the shield may be glued together. The reflective surface of the counterweight may be glued to the angled surface of the body. Alternatively, the reflective surface of the counterweight may be joined with the angled surface of the body by way of heat staking, vibration welding, or the like.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An indicating device comprising:
a dial plate; and
a pointer rotational relative to the dial plate, wherein
the pointer includes a body, a needle, and a counterweight,
the needle extends radially outward from the body,
the counterweight is a separate component from the body and is affixed to the body, and
the counterweight is located on an opposite side of the body from the needle, wherein
the body is non-opaque and has an angled surface,
the counterweight has a reflective surface,
the reflective surface faces the angled surface,
the pointer includes a cover surrounding the body and the counterweight, and
the cover has a window through which the counterweight is at least partially exposed, wherein
the body includes a main body portion and side body portions,
the main body portion has a main angled surface of the angled surface,
each of the side body portions has a side angled surface of the angled surface, and
the side angled surface is angled relative to an axial cross section of the needle to direct light toward a center of the needle, wherein
the counterweight includes a main counterweight portion and side counterweight portions,
the main counterweight portion has a main reflective surface of the reflective surface,
each of the side counterweight portions has a side reflective surface of the reflective surface,
the main reflective surface faces the main angled surface, and
the side reflective surface of each of the side counterweight portions faces the side angled surface, wherein
the main counterweight portion of the counterweight is exposed to an outside of the cover through the window.

2. The indicating device according to claim 1, wherein the counterweight is formed or coated of a metallic or reflective material.

3. The indicating device according to claim 2, wherein the reflective surface is a mirror-finished surface or a reflective surface to reflect light.

4. The indicating device according to claim 2, wherein the body and the needle are integrally formed of a non-opaque resin material.

5. The indicating device according to claim 1, wherein the cover surrounds the needle, and
the cover has a slit through which the needle is at least partially exposed.

6. The indicating device according to claim 1, wherein the main reflective surface covers a part of the main angled surface, and
the side reflective surface of each of the side counterweight portions covers a part of the side angled surface.

7. The indicating device according to claim 1, wherein the reflective surface is formed by one of:
   electro chrome plating;
   chrome foil hot stamping;
   physical vapor deposition;
   vibration polishing; or
   tumble polishing.

8. The indicating device according to claim 1, wherein a shield being opaque and located on a bottom side of the body, wherein
   the shield has an opening through which the body is partially exposed.

9. The indicating device according to claim 8, wherein the reflective surface is opposed to the opening.

10. The indicating device according to claim 1, further comprising:
    a light source configured to emit light, wherein
    the light source is opposed to both the angled surface and the reflective surface.

11. The indicating device according to claim 10, wherein the pointer includes a pointer shaft extended from the body,
    the indicating device further comprising:
    a driver unit including a drive shaft coaxial with the pointer shaft, wherein
    the light source includes a plurality of light source elements located on a radially outside of the drive shaft to surround the drive shaft.

12. The indicating device according to claim 11, wherein the pointer shaft, the body, and the needle are integrally formed of a non-opaque material.

* * * * *